United States Patent

Cunningham

[15] 3,685,433
[45] Aug. 22, 1972

[54] DEEP FAT FRYER ASSEMBLY

[72] Inventor: Cecil R. Cunningham, 1912 Mockingbird Lane, Altus, Okla. 73521

[22] Filed: April 14, 1971

[21] Appl. No.: 133,784

[52] U.S. Cl..................99/408, 210/DIG. 8, 210/416
[51] Int. Cl...............................................A47j 37/12
[58] Field of Search......................99/408, 403–407; 210/416, DIG. 8

[56] References Cited

UNITED STATES PATENTS

| | | | |
|---|---|---|---|
| 3,210,193 | 10/1965 | Martin | 99/408 |
| 2,578,129 | 12/1951 | Daugherty | 99/408 |
| 3,355,026 | 11/1967 | Schut | 210/416 |
| 3,356,218 | 12/1967 | Grudoski | 210/DIG. 8 |
| 3,483,982 | 12/1969 | Nelson | 210/DIG. 8 |
| 3,477,361 | 11/1969 | Bradshaw | 99/408 |
| 3,447,685 | 6/1969 | Bircher | 99/408 X |
| 3,415,181 | 12/1968 | Hart | 99/408 |
| 3,608,472 | 9/1971 | Pelster et al. | 99/408 |
| 3,573,861 | 4/1971 | Lecrone | 99/408 X |

FOREIGN PATENTS OR APPLICATIONS 902,305    1/1954    Germany...................99/408

*Primary Examiner*—Leon G. Machlin
*Attorney*—Dunlap, Laney, Hessin & Dougherty

[57] ABSTRACT

A deep fat fryer assembly which includes a fryer well for containing heated cooking oil to be used in frying, and a filtering and recirculation subassembly connected to the well. The filtering and recirculation subassembly includes a housing having in one side thereof a vertically extending, foraminous, cylindrical filter element through which cooking oil from the well is drawn to remove the solid residual and burned materials from the fat. In another portion of the housing, a gear pump is located and is attached to the shaft of the motor located outside the housing, with the outlet of the pump communicating with the well for recirculating clean, filtered cooking oil from the housing to the well. The housing may be quickly disassembled to permit access to be had to the filter for cleaning the filter and replacing it, and also for maintaining and servicing the gear pump.

8 Claims, 2 Drawing Figures

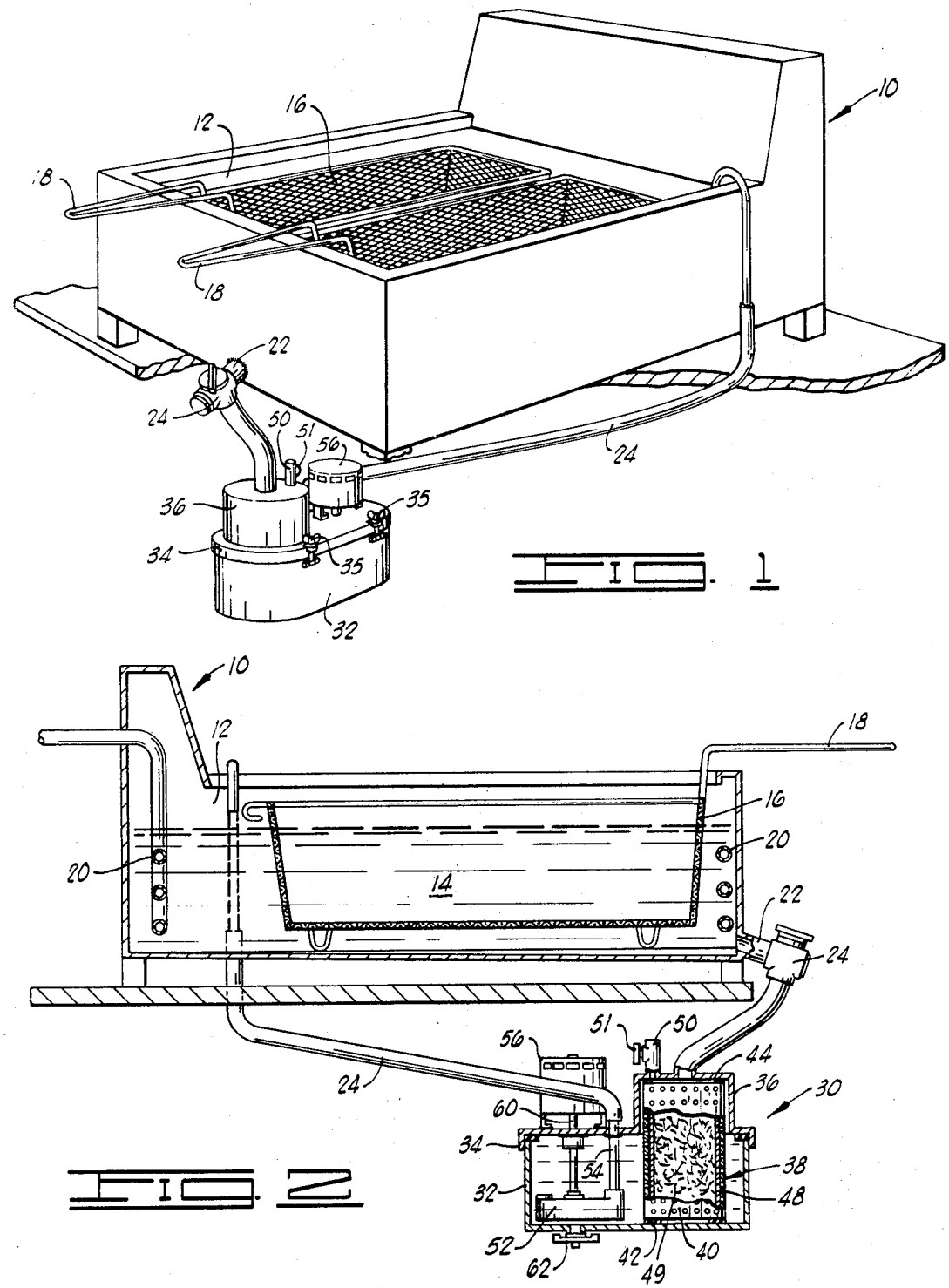

DEEP FAT FRYER ASSEMBLY

BACKGROUND OF THE INVENTION

1. Field of the Invention

This invention relates to filtering systems for use in conjunction with deep fat fryers, and more particularly, to a quickly attachable filtering and cooking oil recycling system which can be used to continuously filter and recycle cooking oil used in a deep fat fryer.

2. Brief Description of the Prior Art:

A prevalent practice in commercial eating establishments, such as restaurants and cafes, is to prepare certain foods by deep fat cooking. In this culinary technique, the foods are immersed in a heated cooking oil. Typically, chicken, potatoes, onions and fish may be cooked in this fashion. In some instances, the food to be cooked is covered with flour or dough before immersion in the cooking oil.

A problem which has been encountered with deep fat cooking is the accumulation of burned grease and food particles in the well of the cooker over extended periods of time, deleteriously affecting the flavor of the foods being cooked, and requiring periodic cleaning of the well after draining all of the cooking oil therefrom. The carbonaceous material resulting from prolonged burning of fats and oils is often difficult to remove, and the cleaning procedure results in undesirable downtime on the cooker.

A number of patents have recently been issued upon proposals for improving the deep fat cooking process by continuously filtering the cooking oil used therein. Most continuous filtration systems provide some form of foraminous or perforated filter element in association with a pump which continuously draws or pumps the cooking oil from the well of the deep fat fryer through the filter elements, and then recycles the cleaned cooking oil to the well after filtration.

Examples of systems which have recently been patented for the purpose of continuously filtering and recycling the cooking oil to a deep fat cooking apparatus are U.S. Pats. Nos. 3,447,685 to Bircher, 3,415,181 to Hart, 3,477,361 to Bradshaw and 3,483,982 to Nelson. Of these several patented systems, the Nelson system provides several advantages in that the filtering and pumping components of the system are located outside the deep fat fryer, and thus do not interfere with the positioning of food receptacles in the well of the fryer. The Nelson system includes a filter device which is separately supported and spaced from a motor and pumping unit used to draw the cooking oil from the well of the fryer through the filter, and then recycle it to the well of the fryer. Several conduit connections are provided between the filter unit and the pump employed in the Nelson system, as well as between this pump and the well of the fryer.

BRIEF DESCRIPTION OF THE PRESENT INVENTION

The present invention provides a compact, easily connected dual filter and pumping subassembly which can be quickly and easily attached to the well of a deep fat fryer or cooker unit, with the subassembly supported as a unit in any convenient location while occupying a minimum of space. The filtering and recycling subassembly is entirely self-contained within a housing, and direct access may be had to the pump and to the filter unit. The filter unit and the pump may be quickly and easily removed from the enclosing housing to permit maintenance, cleaning and replacement.

Broadly described, the present invention comprises a two-part housing including a bottom portion and a lid portion; means detachably retaining the lid portion on the bottom portion; a filter assembly in one portion of said housing frictionally and sealingly engaging the housing when the lid portion thereof is retained on the bottom portion; a pump positioned adjacent the bottom of said housing and spaced from said filter assembly, a motor mounted on the lid portion of said housing and drivingly connected to said pump; inlet means connected through the lid portion to said filter assembly and adapted for connection to the well of a deep fat fryer for conducting cooking fat therefrom to said filter assembly; and means for conveying clean cooking oil from the pump to the well of said deep fat fryer.

In a preferred embodiment of the invention, the housing, filter assembly, pump and motor are connected to, and used in combination with, a deep fat fryer, with the inlet means described connected through a drain cock in a discharge or drain conduit from the well of the fryer, and the means for conveying clean cooking oil from the pump to the fryer comprising a conduit which communicates with the well of the fryer on the opposite side thereof from the drain conduit.

An important object of the invention is to provide a deep fat fryer assembly which includes a compactly constructed oil cleaning and recycling system which can be quickly and easily attached to the well of a deep fat fryer to provide for continuous filtering and recycling of cooking oil used in the deep fat fryer.

Another object of the invention is to provide a system for filtering and recirculating cooking oil to a deep fat fryer, which system is compactly constructed and which affords rapid and easily accomplished access to the filtering and pumping elements included therein to facilitate maintenance and cleaning of these elements.

Additional objects and advantages of the invention will become apparent as the following detailed description of the invention is read in conjunction with the accompanying drawings which illustrate the invention.

BRIEF DESCRIPTION OF THE DRAWINGS

FIG. 1 is a perspective view of a deep fat fryer assembly constructed in accordance with the present invention.

FIG. 2 is a vertical sectional view through portions of the deep fat fryer assembly shown in FIG. 1.

DETAILED DESCRIPTION OF A PREFERRED EMBODIMENT OF THE INVENTION

Referring initially to FIG. 1 of the drawings, shown therein is a conventional deep fat fryer, designated generally by the reference numeral 10. The fryer 10 includes and open topped well 12 in which a body 14 of cooking oil is located for the purpose of frying certain types of comestibles. In a widely used cooking technique, the type of food cooked in the fryer may, for example, be thinly sliced potatoes. The slices of the potatoes are contained in wire mesh baskets 16 which have handles 18 to permit them to be manipulated. Along the side walls inside the well 12, a plurality of tubular heating elements 20 are located for the purpose of maintaining the cooking oil in a heated state adequate for cooking purposes.

Most deep fat fryers, as presently constructed, include a drain conduit 22 provided at the lower side thereof and containing a drain cock 23 which may be opened to permit the cooking oil to be drained from the well 12 of the fryer and discarded or cleaned for re-use. Removal of the cooking oil is also necessary to permit carbonaceous sludge and burnt foods which tend to become caked on the bottom and sides of the well to be removed periodically.

In accordance with the present invention, an oil cleaning and recycling system, designated generally by reference numeral 30, is connected by a conduit 31 to the drain conduit 22 of the deep fat fryer and is also connected to the fryer by means of an oil return conduit 24. The conduit 31, which is flexible, may also be utilized by connecting an extension to it and extending the open end of the extension over the top wall of the well 12 and down into the cooking oil to provide removal thereof by suction. The oil cleaning and recycling system 30 includes a two-part housing made up of a lower or bottom portion 32, and a lid or cover portion 34 which is retained on the bottom portion when the housing is assembled by means of a plurality of screw clamps 35 (see FIG. 1).

As shown in FIG. 1 and 2, the lid portion 34 has an upwardly extending, protuberant cylindrical portion 36 which receives the upper end of a filter assembly designated generally be reference numeral 38. The filter assembly 38 includes a cylindrical foraminous or perforated outer shell or sleeve 40 which is sealed against the bottom of the lower portion 32 of the housing by means of a suitable gasket 42, and is likewise sealed against the top of the protuberant cylindrical portion 36 by means of suitable gasket 44. It will be noted that the filter assembly 38 is frictionally retained in the illustrated position by clamping the lid portion 34 in position by means of screw clamps 35, and that the filter assembly 38 is freed from its clamped engagement with the gaskets 42 and 44 when the lid portion 34 is removed from the lower portion 32.

Positioned inside the rigid cylindrical outer shell 40 is a porous filter paper 48 in cylindrical form. The filter paper 48 is of a diametric dimension to bear against the inside wall of the cylindrical shell 40, and performs a relatively fine filtering action with respect to cooking oil passing therethrough. There may further be included within the filter paper 48 on the interior of the filter assembly 38, a material, such as copper turnings 49, which also strains or filters grease passed through the filter assembly. A vacuum alleviating vent pipe 50 is provided on the protuberant portion 36 over the interior of the sleeve or shell 40 and contains a screw-type valve 51.

Located in the opposite side of the lower portion 32 of the housing of the oil cleaning and recycling system 30 is a centrifugal pump or gear pump 52. The gear pump 52 has an inlet (not shown) through which fat or grease may enter, and further has a discharge connected to a conduit 54 extending upwardly through the cover portion 34 and attached to the recycle conduit 24. An electric motor 56 is mounted on the cover portion 34 and has a drive shaft 60 extending through the cover portion and drivingly connected to the input shaft of the gear pump 52. A drain valve 62 is provided in the bottom wall of the lower portion 32 of the housing beneath the pump 52 to permit residual cooking oil to be drained from the housing during maintenance.

The oil cleaning and recycling system 30 can be quickly and easily connected to the drain conduit 22 of the deep fat dryer 10. With the oil cleaning and recycling system 30 connected in the manner shown, the motor 56 is energized to drive the gear pump 52. As cooking oil is drawn into the gear pump by the rotating vanes contained in, and forming a portion of, this pump, hot cooking oil from the well 12 of the fryer 10 is permitted to discharge through the discharge conduit 22 to the interior of the filter assembly 30 at substantially the same rate as the oil is pumped by the gear pump 52 through the recycle conduit 24. Cooking oil is drawn radially outwardly from the interior of the foraminous sleeve 40, forming a portion of the oil cleaning and recycling system 30, and in moving through the filter paper 48 and sleeve 40, residual bits of burnt grease, food particles and carbon are strained from the cooking oil so that the cooking oil outside of the foraminous sleeve 40, and within the lower portion 32 of the housing of the recycling system, is clean and ready for reutilization.

It will be noted that the recycle conduit 24 returns the cleaned cooking oil to the opposite side of the well 12 from the side at which the discharge conduit 22 is located. There is thus maintained a circulation, within the body 14 of cooking oil contained within the well 12, as the oil moves from one side of this well to another. The location of the recycle conduit inlet to the well and the location of the drain conduit 22 do not interfere in any way with the operation of the fryer for cooking purposes.

An important feature of the present invention is the manner in which the oil cleaning and recycling system 30 is constructed. The two-part construction of the housing, which includes the lower portion 32 and the cover or lid portion 34, permits quick and easy accessibility to the filter assembly 38 and to the gear pump 52 for maintenance purposes. Thus, at such time as it may be desired to clean the filter assembly 38 and renew the filter paper 48 and the copper turnings 49 located therein, this can be quickly and easily accomplished by loosening the screw clamps 35 and removing the cover portion 34. This permits the filter assembly 38 to be quickly removed and, if desired, permits the gaskets 42 and 44 to be replaced after the filter has been cleaned and reinserted in the housing. Maintenance of the gear pump 52 is easily carried out because of its accessibility, and the motor 56 is also, of course, easily accessible and can be maintained without difficulty.

The deep fat fryer assembly of the invention can be used for continuously cleaning the cooking oil used therein without downtime on the fryer per se. Tests with the system have indicated that the cooking oil can be made to last from 50 to 100 percent longer without replacement. Little or no cleaning of the well of the fryer due to the accumulation of burnt grease and food particles therein is required.

Although a preferred embodiment of the invention has been herein described and illustrated in the drawings, it will be understood that various changes and modifications can be effected in the described structure without departure from the basic principles of the invention. Changes and innovations of such type as do not entail a departure from such basic principles are therefore deemed to be circumscribed by the spirit and scope of the invention except as the same may be limited by the appended claims or reasonable equivalents thereof.

What is claimed is:

1. A deep fat fryer assembly comprising:
   a well for containing cooking oil;
   a two-part housing, including:
      a bottom portion; and
      a cover portion detachably retained on said bottom portion;
   a filter sub-assembly in said housing and including:
      a rigid foraminous cylinder sealed at one of its ends against said cover portion and at its other end against said bottom portion when said cover portion is retained on said bottom portion; and
      a filter paper lining the foraminous cylinder;
   a pump in the bottom portion of said housing and spaced horizontally from said filter sub-assembly;
   a motor mounted on said cover portion outside said housing and drivingly connected to said pump;
   first conduit means communicating said pump with said well for conveying filtered cooking oil from the pump to the well; and
   second conduit means connecting said well to the interior of said foraminous cylinder through the cover portion of said housing.

2. A deep fat fryer assembly as defined in claim 1 wherein said second conduit means includes:
   a drain conduit connected to the lower side of said well on the opposite side thereof from the point of communication with said well of said first conduit means; and
   a drain cock in said second conduit means for controlling the rate of flow of cooking oil from said well to the interior of said foraminous cylinder.

3. A deep fat fryer as defined in claim 2 and further characterized as including means for gravity draining cooking oil from the bottom portion of said housing.

4. A deep fat fryer as defined in claim 2 and further characterized as including:
   a vacuum alleviating pipe on said cover portion over the space within said foraminous cylinder; and
   valve means in said vacuum alleviating pipe.

5. A cooking oil filtering and recirculating system adapted for connection to the well of a deep fat fryer comprising:
   a housing including:
      a cover portion having a protuberant cylindrical portion;
      a bottom portion having an open top cooperating with, and closed by, said cover portion; and
      manually operably means for securing said cover portion on said bottom portion;
   cylindrical filter means positioned in one side of said housing and having one end extending into the protuberant cylindrical portion of said cover portion and contacting said cover portion, and having a second end contacting the base portion of said housing;
   means on said cover portion for adjustably venting the space inside said cylindrical filter means to the atmosphere;
   first conduit means connectable to the well of a deep fat fryer and communicating with the space inside said cylindrical filter means for conveying cooking oil from said well to said space;
   a pump disposed in said housing adjacent the bottom of said bottom portion and horizontally spaced from said filter means;
   second conduit means connected to said pump and adapted for conveying cooking oil from said pump through said housing to said deep fat fryer well; and
   a motor mounted on said cover portion on the outside of said housing and drivingly connected to said pump.

6. A cooking oil filtering and recirculating system as defined in claim 5 wherein said cylindrical filter means comprises:
   a foraminous, rigid cylindrical sleeve; and
   a filter paper lining the internal wall of said cylindrical sleeve.

7. A cooking oil filtering and recirculation system as defined in claim 6 and further characterized to include valve means on the bottom of said bottom portion for gravity draining cooking oil from said housing.

8. A cooking oil filtering and recirculating system as defined in claim 7 and further characterized as including a drive shaft interconnecting said motor and pump and extending substantially parallel to the axis of said rigid cylindrical sleeve.

* * * * *